United States Patent [19]
Shiina

[11] Patent Number: 4,725,172
[45] Date of Patent: Feb. 16, 1988

[54] EDGED TOOL POSITIONING DEVICE FOR USE IN A MACHINE TOOL

[75] Inventor: Fumiyuki Shiina, Tokyo, Japan

[73] Assignee: Kabushiki Gaisha Sankoh-Chemical, Tokyo, Japan

[21] Appl. No.: 914,068

[22] Filed: Oct. 1, 1986

[51] Int. Cl.⁴ .............................................. B23B 39/04
[52] U.S. Cl. ........................................ 409/218; 408/8; 408/13
[58] Field of Search .................... 408/8, 11, 12, 13, 16, 408/6, 10, 239 R; 409/133, 134, 218; 33/558, 561

[56] References Cited

U.S. PATENT DOCUMENTS

| | | | |
|---|---|---|---|
| 4,056,329 | 11/1977 | Perry | 408/6 |
| 4,090,802 | 5/1978 | Bilz | 408/6 |
| 4,203,691 | 5/1980 | Nishimura et al. | 408/8 |
| 4,329,771 | 5/1982 | Eto et al. | 409/134 X |
| 4,396,322 | 8/1983 | Nomura et al. | 408/8 X |
| 4,408,933 | 10/1983 | Tomita et al. | 408/8 |
| 4,553,001 | 11/1985 | Kroetsch | 33/561 X |

FOREIGN PATENT DOCUMENTS 3206354  9/1983  Fed. Rep. of Germany ........ 408/12

*Primary Examiner*—Gil Weidenfeld
*Assistant Examiner*—Glenn L. Webb
*Attorney, Agent, or Firm*—Birch, Stewart, Kolasch & Birch

[57] ABSTRACT

Disclosed is an edged tool positioning device which is fixed to the quill of a machine tool for permitting the edged tool to reach a desired X- and Y-coordinate position on a workpiece and for permitting the edged tool thus put at the desired X- and Y-coordinate position to advance a desired distance in the thickness of the workpiece in the Z-direction. Every time the device is brought in contact with at least one selected side and upper surface of the workpiece, a warning unit built in the device informs a worker of the contact by the device with the workpiece, thus permitting him to find a start position and measure a desired distance in each direction.

3 Claims, 2 Drawing Figures

EDGED TOOL POSITIONING DEVICE FOR USE IN A MACHINE TOOL

BACKGROUND OF THE INVENTION

Field of the Invention

The present invention generally relates to a drilling machine, a milling machine, a lathe or any other machine tool, and more particularly to a positioning device for putting an edged tool exactly at a desired position on a workpiece to be machined.

Description of the Prior Art

In an attempt to eliminate the necessity of complicated markings to find in a workpiece a desired position at which the workpiece is to be machined, the inventor proposed a device for putting the center of an edged tool of a machine tool exactly on a selected side of a workpiece, from which side the edged tool can move a measured distance to the desired position (See Japanese Utility Model Publication No. 50-43434).

Referring to FIG. 1, such a proposed device comprises an elongated hollow cylindrical section 21 and a shortened hollow cylindrical section 22, both aligned on a common axis and resiliently connected to each other. In use the two-sectioned cylindrical device is fitted in the chuck 7 of a machine tool in place of an edged tool. The two-sectioned cylindrical device is so adjusted on its level that its shortened end section 22 is below the upper surface level of the workpiece 12 and that its elongated secton 21 remains above the upper surface level of the workpiece. Then, the cylindrical device while rotating is moved towards a selected side of the workpiece 12. When the cylindrical device is brought in contact with the selected side of the workpiece 12, the shortened end section is somewhat displaced with respect to the elongated section as a counter action to the contact with the workpiece, and then the rotation of the cylindrical device automatically stops, indicating that the cylindrical device is put in contact with the selected side of the workpiece 12. Then, the cylindrical device is replaced by an edged tool, and the edged tool is moved a measured distance plus the radius of the edged tool to reach a desired coordinate position in an X-or Y direction.

The proposed device, however, has a few disadvantages: after having found a start position, it is necessary to replace the device by an edged tool for performing required machining. The proposed device is useful only in two - dimensional positioning, or in finding a desired X-and Y-coodinate position, but it is useless in detecting a desired depth in a Z-direction (i.e along the axis of rotation of the edged tool).

Because the two-sectional cylindrical device cannot put its shortened end section offset with respect to its elongated section as a counter action to the contact with the upper surface of the workpiece, the device cannot find a start point from which a desired depth is to be measured in the Z-direction.

With the drawbacks of the prior art in mind the object of the present invention is to provide an edged tool positioning device eliminating the necessity of replacing the positioning device by the edged tool, still permiting a three-dimensional positioning in X-,Y-and Z directions with ease.

SUMMARY OF THE INVENTION

To attain this object an edged tool positioning device according to the present invention comprises: an edged tool holder which is adapted to be fixed to the body of a machine tool in the electrical insulating relationship with the machine tool body; and a series-combination of a warning device and an associated electric battery, said warning device being electrically connected both to said edged tool through said edged tool holder and to one terminal of said electric battery, and the other terminal of said electric battery being electrically connected to the body of said machine tool, thereby permitting the energization of said warning device when said edged tool is brought in contact with a workpiece lying on the worktable of said machine tool.

In use, in finding an X-and Y- coodinate position, the tip of the edged tool is brought down to a level below the upper surface of a workpiece, and then the workpiece is moved towards the edged tool. When the workpiece is brought in contact with the edged tool, the warning device is put in a closed circuit with the electric battery, thereby causing an electric current to flow from the electric battery to the warning device through the body of the machine tool, the workpiece and the edged tool, informing a worker of the contact by the edged tool with a selected side of the workpiece. Then, the workpiece is moved a measured distance plus the radius of the edged tool, thus allowing the edged tool to reach an exact X-coodinate position.

Likewise, a Y-coordinate position is found, and then the rotary center of the edged tool is brought to a desired X-and Y-coordinate position. Next, in determining a Z-coordinate position, the edged tool thus put at the desired X-and Y-coordinate position is lowered until it is brought in contact with the upper surface of the workpiece. The warning device again informs the worker of the contact by the edged tool with the upper surface of the workpice. Thus, a start point in the Z-direction is found. Now, the machine tool is set for allowing the edged tool to advance a desired depth in the Z-coodination.

DESCRIPTION OF A PREFERRED EMBODIMENT

Figure 1:
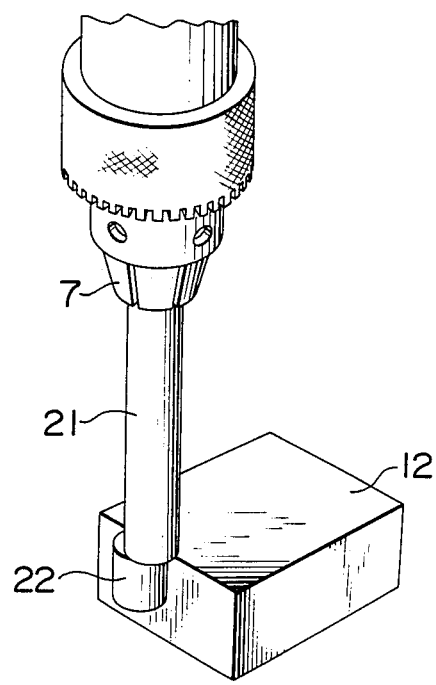
FIG. 1 is a perspective view of a conventional position finding device.
Figure 2:
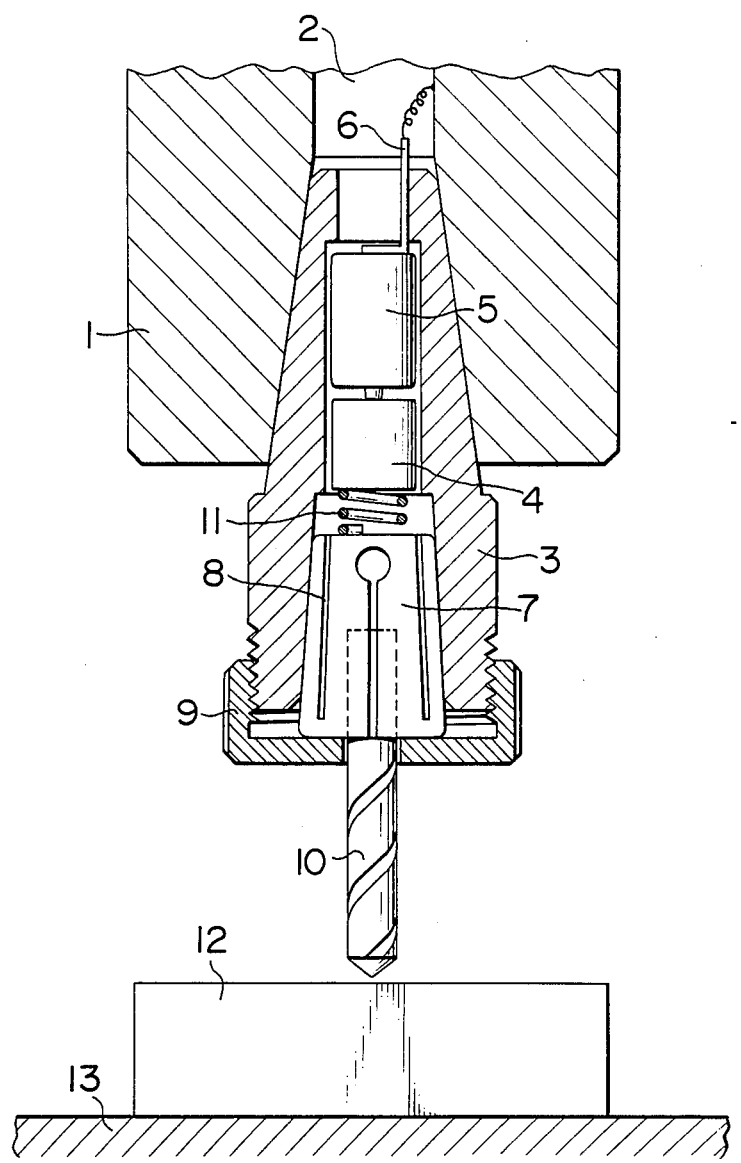
FIG. 2 shows a longitudinal section of an edged tool positioning device according to one embodiment of the present invention.

FIG. 2 shows a positioning device according to one embodiment of the present invention. In the drawing the quill of a drilling machine is designated at 1, and a cylindrical holder 3 made of a dielectric material such as ceramic is fitted in a downward divergent hole 2 at the end of the quill 1, and the holder 3 is fixed to the end of the quill 1 by means of bolts (not shown). A buzzer 4 and a dry battery 5 are fitted in the upper straight hole contiguous with the downward-divergent hole of the holder 3, and the minus terminal of the dry battery is connected to the quill via an associated resilient contact piece 6. A chuck is designated at 7, and is shown as a hollow metal cylinder whose cylindrical wall has a plurality of longitudinal slits 8, thereby permitting the same to reduce diametrically, resiliently yielding when an external force is applied therto. The chuck 7 is pushed into the downwardly-divergent hole of the holder 3. The holder 3 has an associated cap 9 threadly engaged with the open end of the holder 3. Rotation of the cap 9 will cause the cylindrical chuck 7 to advance in the downwardly-divergent hole, reducing the cross-sectional area of the cylindrical body, and accordingly increasing the force with which a twist drill 10 is held until it is firmly gripped. A coiled spring 11 is put between the top of the chuck 7 and the casing of the buzzer 4, thereby providing an electrical connection there between.

In operation, first, a workpiece 12 is put aside from the space just below the twist drill 10 on a worktable 13, and the tip of the twist drill 10 is lowered to a level below the upper surface of the workpiece 12. Then, the workpiece 12 is moved towards the twist drill 10. When the twist drill 10 is brought in contact with a selected side of the workpiece, an electric current flows from the dry battery to the buzzer 4 via the twist drill 10 and the workpiece 12, which together constitute a switch. Then, a sound is generated.

The twist drill is raised above the workpiece 12, and is moved horizontally a measured distance from the selected side to a point at which a hole is to be made plus the radius of the twist drill, thus putting the tip of the twist drill exactly at the X-coordinate position as desired.

Similarly the tip of the twist drill is brought exactly to the Y-coordinate position. Then, the twist drill 10 is lowered towards the workpiece 12 at the exact X and Y coordinates, and when the tip of the twist drill 10 is brought in contact with the upper surface of the workpiece 12, again the buzzer 4 sounds, and then the descent of the twist drill is made to stop. The level at which the descent of the twist drill stops is selected as the origin from which a desired hole depth is to be measured.

When a positioning device is applied to a milling machine, a milling cutter is combined with the positioning device in the same way as the twist drill is combined with the device in the drilling machine above described. When a positioning device is applied to a lathe, its edged tool holder is used as a chuck 7, and therefore the tool holder need be provided with an appropriate insulator.

If a plurality of small holes are made in the chuck body 3, the sound from the buzzer 4 is easy to hear. In place of the buzzer a lamp may be used, and if the buzzer and the lamp are used in combination, a worker can be informed more assuredly. As for necessary insulation between the quill and the twist drill it suffices that the chuck metal is coated with a dielectric material.

As may be understood from the above, an edged tool is fixed to the body of a machine tool in an electrical insulating relationship with each other, and the edged tool is electrically connected to the body of the machine tool through a warning device and an associated electric battery, thus putting the warning device in closed circuit with the electric battery to sound when the edged tool is brought in contact with a workpiece lying on a worktable of the machine tool, informing a worker of the contact of the edged tool with the workpiece. Every time he is informed of the contact of the edged tool with the workpiece in each of the X-,Y-and Z-direction, he can put the edged tool in the exact X-and Y-coordinate positions, and can set a desired hole depth in the Z-direction.

Immediately after completing the setting of the edged tool he can start machining without further delay. This assures machining at an increased efficiency.

What is claimed is:

1. An edged tool positioning device, for use in a machine tool, comprising
   a cylindrical holder made of dielectric material,
   an opening extending through said holder,
   a battery, having first and second terminals, located in said opening,
   a warning device located in said opening and in contact with said first terminal of said battery,
   said opening being tapered on one end portion thereof,
   a chuck located in said end portion and holding an edged tool,
   said first terminal of said battery being electrically connected to said edged tool through said warning device and said chuck, and
   said second terminal of said electrical battery being electrically connected to the machine tool thereby permitting the energization of said warning device when said edged tool is brought in contact with a workpiece lying on a worktable of said machine tool.

2. An edged tool positioning device according to claim 1, wherein said warning device is a buzzer.

3. An edged tool positioning device according to claim 1, wherein said warning device is a lamp.

* * * * *